United States Patent Office 3,576,738
Patented Apr. 27, 1971

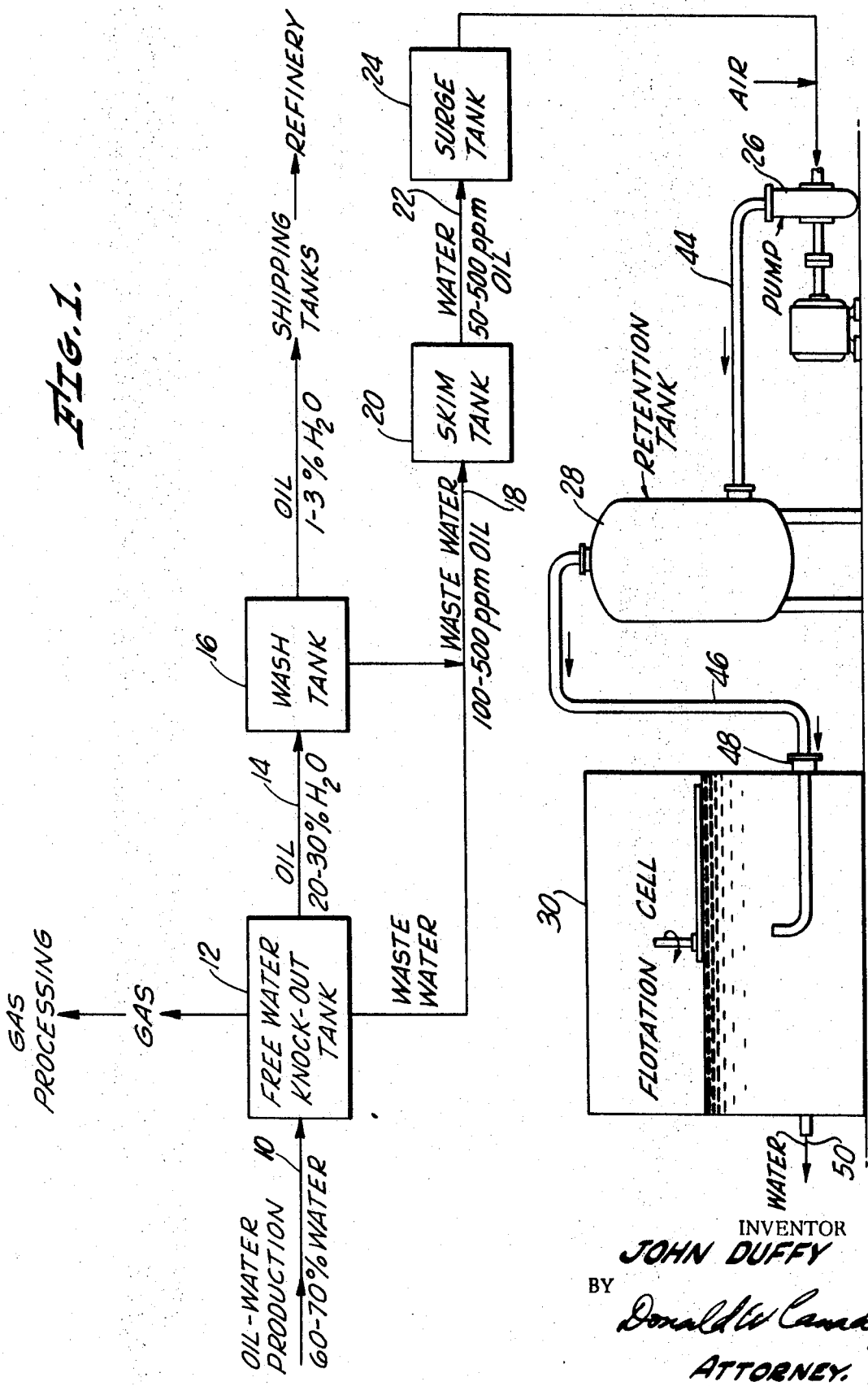

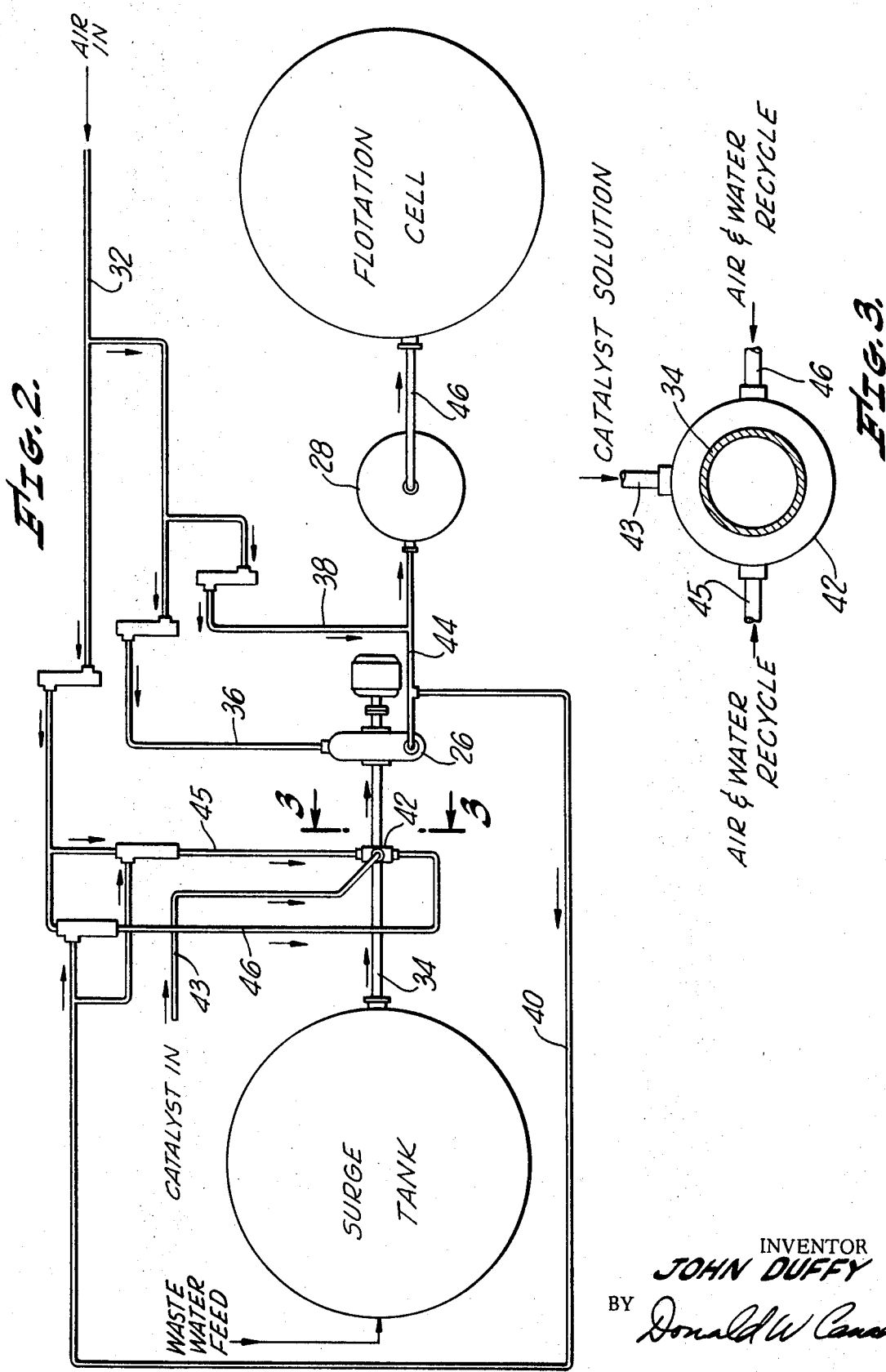

3,576,738
PROCESS FOR PURIFICATION OF OIL
PRODUCTION WASTE WATER
John Duffy, Huntington Beach, Calif., assignor to
The Signal Companies
Filed Aug. 4, 1969, Ser. No. 847,827
Int. Cl. C02b 1/34
U.S. Cl. 210—44           8 Claims

ABSTRACT OF THE DISCLOSURE

A method for removing residual oil and dissolved sulfides from oil production waste waters prior to disposal of the waste water into the ocean, by the injection of controlled amounts of air and soluble nickel catalyst into the waste water. The mixture is pumped under pressure into a flotation cell or tank where the pressure is released and the air effects oil separation and oxidation of the dissolved hydrogen sulfide.

BACKGROUND OF THE INVENTION

Large volumes of water are treated prior to disposal or reuse in the oil industry in both refinery operations and crude oil production. Primary oil production produces crude oil with as much as 20 to 50% water. In water flooding operations, commonly used as a secondary recovery method for oil production, oil is produced by injecting sea water into an oil bearing sand to push the oil and water in the sand formation towards adjacent wells where it is pumped to the surface. The oil thus produced is an oil-water mixture containing about 60 to 70% water. The oil in such production mixtures is normally separated from the water by physical separation means, such as settling tanks. The waste water from which the oil in the mixture is separated, still contains on the order of 50 to 500 p.p.m. oil and must be subjected to further cleanup operations to remove such residual oil therefrom prior to discharge into adjacent bodies of water. The discharge of waste water into the ocean, for example, is regulated by governmental water quality control agencies which establish quality requirements for the waste water discharged into the ocean in order to protect the beneficial uses of the ocean.

The waste water clean-up operation employed conventionally is a flotation process by which air is injected into the water and the mixture pressurized by pumping the oil-water mixture from a surge tank into a flotation cell where the pressure is released, so that as the air bubbles through the water attaches to the suspended oil globules or particles which reduces the effective specific gravity of the particles and causes the oil to move upwards where it can be skimmed off in the flotation cell.

Another requirement for waste water discharge into the ocean, is a limitation of the amount of dissolved sulfide, which is usually present as hydrogen sulfide either unionized or ionized depending upon the pH of the water.

Hydrogen sulfide may be removed from water by several methods, e.g. air or gas stripping, chlorination, precipitation and air oxidation. Gas or air stripping physically removes the hydrogen sulfide from the water and transfers it to the off-gas and ultimately to the atmosphere, which is objectionable from an air pollution standpoint. The stripping process also tends to raise the pH of the waste water which increases the scaling tendency of the water.

The removal of hydrogen sulfide by chlorination is applicable from a practical stand point, only to water of low sulfide content. Where the amount of hydrogen sulfide to be removed is substantial, the cost of the chlorine gas becomes excessive. Precipitation methods, with zinc chloride, for example, are also limited to waste waters having relatively small sulfide contents because of cost considerations. Air oxidation processes for removing hydrogen sulfide from waste waters on an economically feasible basis, require an alkaline solution, since air oxidation of hydrogen sulfide in neutral or acidic waste waters is normally too slow to be economically feasible.

It is an object of my present invention to combine the hydrogen sulfide removal operation, with separation of residual oil from waste waters preparatory to disposition of the waste waters in public water ways e.g. oceans.

It is also an object of my present invention to provide a process for the removal of hydrogen sulfide from oil production waste waters in a flotation cell operated to remove residual oil from said waste waters.

It is a further object of my present invention to provide a process for effecting a more complete separation of residual oil from waste waters in a flotation cell operation.

SUMMARY OF THE INVENTION

It is proposed by my present invention to combine sulfide removal with the flotation oil clean-up process by injecting an oxidation catalyst, i.e. a soluble nickel compound, into the waste water during aeration and providing sufficient additional air into the pump discharge to effect rapid oxidation of the hydrogen sulfide in the flotation cell separation. It has been discovered that in addition to effecting an efficient sulfide separation, my present process enhances the oil removal effected in the flotation cell.

BRIEF DESCRIPTION OF DRAWING

FIG. 1 shows in schematic form, a method for separating water from a produced oil and water mixture prior to disposal.

FIG. 2 is a schematic plan view of my present invention showing injection of air and catalyst into the waste water.

FIG. 3 is a cross-sectional view taken at section 3—3 of FIG. 2.

DETAILED DESCRIPTION OF INVENTION

With reference to the embodiment of my invention shown in FIG. 1, oil production from water flooding operation is produced from a well (not shown) and pumped through line 10 to settling tank 12, commonly called a "free water knock-out" tank. In the settling or free water knock-out tank 12, the gas products are released and sent to gas processing operations and the oil, with approximately 20 to 30% water therein, is transmitted through line 14 to a heated wash tank 16. In tank 16 the waste water is heated and the oil-water mixture separated by settling. The water content of the water is reduced to about 1 to 3% water. Wash tanks such as tank 16, or "heater treaters" as gas fired tanks are sometimes called, contain means for heating the waste water to about 100° to 210° F. depending upon the type of crude oil being separated. For example, an 18 gravity crude oil is heated to about 140° F.—generally heavier crudes are heated to higher temperatures.

The oil separated in wash tank 16, is pumped to shipping tanks or a pipeline for transporting to storage or refinery processing. The waste water removed in the settling tank 12 is combined with the waste water from wash tank 16 in line 18 and additional oil removed therefrom in skim tank 20.

The wash water from skim tank 20 still has approximately 50 to 100 p.p.m. residual oil which must be removed prior to pumping into the ocean. This water is passed through line 22 to a container vessel or surge tank 24 from which it is pumped by pump 26 into retention tank 28 and flotation cell 30. Air is injected into the suction side of the pump 26 so that the pressurized wash water can be further cleaned up by the flotation technique. Each of the processing and apparatus items heretofore described are conventional and well known oil-water separation techniques.

Referring now to FIG. 2, air is injected through line 32 into line 34 between the surge tank 24 and pump 26. In order to inject sufficient air to effect sulfide removal, air is also injected under pressure to the volute of pump 26 through line 36 and into the discharge end of the pump through line 38. A water soluble nickel oxidation catalyst is injected into the waste water on the suction side of the pump at approximately the point of aeration, e.g. at the T 42. A small amount of water is recycled from the discharge side of the pump at line 44 to air injection line 46 through line 40 to minimize the possibility of air locking the pump. In other words the air is injected into the waste water in line 34, as an air-water mixture or froth.

FIG. 3 shows a manner in which the air may be injected into the line 34 through lines 45 and 46 after premixing with recycled water, at approximately the same point that the catalyst is injected through line 43.

The aerated waste water is pumped into the retention tank 28 from line 34 and under the pump pressure, flows through line 46 into the flotation cell 30 through back pressure valve 48 which is positioned at the flotation cell entry. The flotation cell 30 is maintained at atmospheric pressure, and as the waste water which is saturated with air under pressure enters the flotation cell, the reduction in pressure causes the air to be released from solution in the form of small bubbles which carry the free oil globules to the surface in the water flotation cell. Oil may then be removed from the water surface by mechanical skimming means e.g. a rotary skimming arm. Clean waste water is removed from the flotation cell through line 50.

The nickel catalyst added to the waste water prior to flotation, may be any water soluble nickel compound such as, nickel sulfate, nickel acetate, nickel chloride, nickel sulfamate, nickel nitrate, chelated nickel, etc. The amount of nickel is limited both by economics and by the fact that excess amounts of nickel discolor the water due to the formation of black nickel sulfide. The nickel may be added in an amount from about 0.1 p.p.m. to the limit of solubility of the nickel compound in the waste water. Generally, the nickel is added in an amount of abount 0.1 p.p.m. to 1.0 p.p.m., with the preferred range about 0.5 p.p.m to 10 p.p.m. In the preferred catalyst concentration range it was found that the reaction time was about two minutes At the increased concentrations of the nickel catalyst, the reaction time may be reduced, however, as above indicated, increasing the catalyst concentration is normally undesirable due to prohibitive costs and the tendency to form the black nickel sulfide. The temperature at which the sulfide may be removed in the flotation cell, is not critical, however, the temperature of about 50° to 150° F. is preferable. The temperature of the flotation operation is determined by the temperature of the waste water from the wash tanks (via skim tank 20). Although it is believed that increased temperatures would be desirable, heating within the flotation cell is believed to be impractical, with presently available equipment.

The sulfide removal operation may be accomplished at pressures from atmospheric to super-atmospheric, that is on the order of 100 p.s.i. The pressure on the waste water controls the amount of air in solution and its maximum is limited by the pressure capacity of the retention tank and the corrosiveness of the water containing large amounts of oxygen. The preferred pressure range, that is, the pressure imposed upon the waster water prior to its entry into the flotation cell, is about 20 to 50 p.s.i.g.

The catalyst should preferably be added during aeration rather than before aeration, to avoid absorption of the catalyst by the oil. If the catalyst is absorbed by the oil, the sulfide removal will be reduced significantly. The catalyst may be added to the pump suction in order to effect good mixing, although the catalyst solution and air may be added to the pump discharge ahead of the retention tank.

The amount of air added to the waste water for sulfide removal and flotation should be at least the amount stoichiometrically necessary for the reduction of sulfide to about 0.5 p.p.m. sulfide, which is about 0.05 to 1.5 s.c.f. air per barrel. The upper limit is not critical but rather is limited by the fact that excessive air tends to remove the dissolved hydrogen sulfide by stripping, which could put large amounts of noxious hydrogen sulfide gas into the atmosphere.

The following examples are given to illustrate the effectiveness of my invention and are merely illustrative and should not be construed as limiting the scope of my invention.

EXAMPLE I

Nickel chloride was added to a jar containing oil production waste water prior to final clean up and the jar sealed and shaken for one to five minutes.

This procedure was repeated as indicated and the results tabulated in Table I.

TABLE I

| Nickel added (p.p.m.) from nickel chloride | Total sulfide (p.p.m.) after shaking with air for— | | | | |
|---|---|---|---|---|---|
| | 0 minute | ½ minute | 1 minute | 2 minutes | 5 minutes |
| None | 28 | | 24 | | 22 |
| 0.1 | 28 | | | 11 | |
| 0.5 | | | 8 | 2.5 | |
| 1.0 | | 9.0 | 1.5 | | |
| 5.0 | | | 0.1 | | |

EXAMPLE II

A solution of nickel chloride was injected into the discharge line from the charging pump to a flotation cell in a plant similar to that shown in FIG. 1. The solution was added in an amount so as to add 1 p.p.m. of nickel to the water entering the retention tank. Air was added to the pump suction, the pump volute, and the pump discharge at rates of 1.5 cubic feet per minute, 1.0 cubic foot per minute and 1.5 cubic feet per minute respectively at 20 p.s.i.g. on the suction side and 60 p.s.i.g. on the pump volute and discharge side. These air rates correspond to 0.18, 0.26, and 0.40 s.c.f. air per barrel, respectively.

The results of this test are shown in Table II

TABLE II

| | Total sulfide (p.p.m.) | | |
|---|---|---|---|
| | To surge tank | From retention tank | From flotation cell |
| Before nickel injection | 21 | 16 | 16 |
| During nickel injection | 21 | 1 | 0.5 |

EXAMPLE III

Nickel sulfate was added to another flotation cell (cell No. 3 at Tank Farm No. 1) in a set up similar to that shown in FIG. 1. All of the tank farm water was going to this cell and the volume amounted to 68,000 barrels per day. The results of this test are summarized in Table III.

TABLE III

(1) Sulfide Removal from Waste Water

| Time | Catalyst (p.p.m.) | Total sulfide (p.p.m.) | |
|---|---|---|---|
| | | To surge tank | From flotation cell |
| 9:30 a.m. | None | 36 | 30 |
| 10:30 a.m. | 1.0 | 34 | 0.2 |
| 5:30 p.m. | 0.59 | 36 | 1.5 |

(2) H$_2$S Content in Off Gas from Flotation Cell

| Time | Catalyst (p.p.m.) | HS$_2$ (p.p.m.) | Percent | |
|---|---|---|---|---|
| | | | CO$_2$ | O$_2$ |
| 9:30 a.m. | None | 7,000 | 24 | 16.5 |
| 10:30 a.m. | 1.0 | 25 | 23 | 4.5 |
| 5:30 p.m. | 0.59 | 500 | 23 | 4.5 |

(3) Effect of Catalyst on Oil Removal

| Time | Catalyst (p.p.m.) | Tretolite demulsifier | (Oil) p.p.m. | |
|---|---|---|---|---|
| | | | In | Out |
| 2:30 p.m. | None | x | 60 | 20 |
| 5:30 p.m. | None | x | 65 | 20 |
| 8:00 a.m. | 1.0 | x | -------- | 5 |
| 9:45 a.m. | 1.0 | x | -------- | 5 |
| 1:45 p.m. | 1.0 | x | -------- | 5 |
| 3:45 p.m. | 0.59 | (¹) | -------- | 16 |

(4) Effect of Air Rate on Sulfide Oxidation

| Rotameter (c.f.m.) | | | Total air rate, s.c.f.m./bbl. | Catalyst (p.p.m.) | Sulfide, p.p.m. | |
|---|---|---|---|---|---|---|
| Air pump suction | Pump Volute | Pump Discharge | | | In | Out |
| 4 | 4 | 4 | 0.76 | 0.59 | 34 | 7 |
| 4 | 5 | 5 | 0.92 | 0.59 | 34 | 4 |
| 4 | 5½ | 5½ | 1.0 | 0.50 | 36 | 1.5 |
| 4 | 5 | 4.5 | 0.88 | 1.0 | 36 | 3 |
| 4 | 5½ | 5½ | 1.0 | 1.0 | 34 | 0.2 |

¹ Tretolite cutout for 2 hours.

(5) The appearance of the outfall "boil" was viewed and photographed from a helicopter before and during the catalyst test. The "boil" and adjacent water showed less discoloration (i.e. black) during the catalyst test than before the test.

The results obtained in the above examples were excellent and, in fact, an additional benefit of this material toward oil removal was demonstrated. It is postulated that the elemental sulfur that is formed from oxidation of sulfide acts as a floc which helps remove oil from the water. Subsequently, a test in which the demulsifier treatment was cut out indicated that the elemental sulfur was doing a better job of oil removal than the demulsifier.

What is claimed is:

1. A process for removing residual oil and dissolved sulfides from waste water prior to discharge into the ocean, comprising the steps:
   (a) pumping said waste water from a container vessel thereby pressurizing said water,
   (b) introducing an oxygen containing gas and a water soluble nickel compound in an amount of nickel between about 0.1 to 1.0 p.p.m. of waste water treated, into said water under said pressure to effect catalytic air oxidation of said sulfides to sulfur,
   (c) introducing said pressurized water with said gas and said nickel compound into a flotation cell maintained at a pressure less than the pressure to which said water was subjected by said pumping, to thereby release the pressure on said water and permit said gas to bubble through said water to effect separation of said oil and said sulfur formed in said oxidation, and
   (d) removing said oil and sulfur at the surface of said liquid in said flotation cell.

2. The process of claim 1 wherein said oxygen containing gas is added in an amount of from about 0.01 to 1.0 s.c.f. per barrel of waste water treated.

3. The process of claim 1 wherein said nickel compound is nickel sulfate.

4. The process of claim 1 wherein said oxygen containing gas and said nickel compound are added to said water at the suction side of said pump.

5. The process of claim 1 wherein said oxygen containing gas and said nickel compound are added to said waste water at the discharge side of said pump.

6. A process for removing residual oil and hydrogen sulfide from waste water prior to discharge into the ocean, comprising the steps:
   (a) withdrawing said waste water from a surge tank into the suction side of a pump through a suction line,
   (b) introducing at least about 0.05 standard cubic feet of air per barrel and about 0.5 to 1.0 p.p.m. of a soluble nickel compound into said water to effect catalytic oxidation of said sulfide to elemental sulfur,
   (c) pumping said water with said air and nickel compound therein, to a retention tank through a pump discharge line,
   (d) releasing the pressure on said water to cause said air to bubble through said water, by introducing said water from said retention tank into a flotation cell, and
   (e) removing said oil and sulfur at the water level in said flotation cell.

7. A process for removing residual oil and hydrogen sulfide from waste water prior to discharge into the ocean, comprising the steps:
   (a) withdrawing said waste water from a surge tank into the suction side of a pump through a suction line,
   (b) introducing at least about 0.05 standard cubic feet of air per barrel and about 0.5 to 1.0 p.p.m. of a soluble nickel compound into said water through said suction line to effect catalytic oxidation of said sulfide to elemental sulfur,
   (c) pumping said water with said air and nickel compound therein, to a retention tank through a pump discharge line.
   (d) introducing additional air under pressure into said water through said discharge line,
   (e) releasing the pressure on said water to cause said air to bubble through said water, by introducing said water from said retention tank into a flotation cell, and
   (f) removing said oil and sulfur at the water level in said flotation cell.

8. The method of claim 1 wherein said nickel is introduced in a small but effective amount of not more than about one p.p.m. of waste water treated.

References Cited

UNITED STATES PATENTS

| | | | |
|---|---|---|---|
| 1,799,444 | 4/1931 | Sperr | 210—44X |
| 1,908,545 | 5/1933 | Schwab et al. | 210—50 |
| 2,446,655 | 8/1948 | Lawrason | 210—44 |

OTHER REFERENCES

Babbitt, H. E., Sewerage and Sewage Treatment, Sixth Edit., 1947, John Wiley & Sons, N.Y., pp. 383–385 relied on.

Rohlich, Gerard A., Application of Air Flotation to Refinery Waste Waters, Ind. & Eng. Chem., vol. 46, February 1954, pp. 304–308.

MICHAEL ROGERS, Primary Examiner

U.S. Cl. X.R.

210—50, 221